(12) United States Patent
Chen et al.

(10) Patent No.: US 9,454,189 B1
(45) Date of Patent: Sep. 27, 2016

(54) SYSTEMS AND METHODS FOR DISTRIBUTING POWER IN A SERVER SYSTEM

(71) Applicant: Quanta Computer Inc., Taoyuan (TW)

(72) Inventors: Chao-Jung Chen, Taoyuan (TW); Chi-Fu Chen, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 11 days.

(21) Appl. No.: 14/688,655

(22) Filed: Apr. 16, 2015

(51) Int. Cl.
*G06F 1/26* (2006.01)
*G06F 1/18* (2006.01)
*G06F 1/20* (2006.01)

(52) U.S. Cl.
CPC ............... *G06F 1/181* (2013.01); *G06F 1/206* (2013.01); *G06F 1/26* (2013.01)

(58) Field of Classification Search
CPC .. G06F 1/26–1/206; H05K 7/20218–7/20381; H05K 7/20409–7/20418; H05K 7/20009–7/202; H01L 23/367–23/3677; H01L 23/473; H01L 23/46–23/467
USPC ........................ 361/676–678, 679.46–679.54, 361/688–723, 756, 741, 686, 687, 725, 787, 361/789, 794, 807–810; 165/80.1–80.5, 165/104.33, 185; 174/15.1–15.3, 174/16.1–16.3, 547, 548; 257/712–722, 257/E23.088; 24/453, 458–459; 454/184; 312/236
See application file for complete search history.

(56) References Cited

U.S. PATENT DOCUMENTS

| 8,743,549 B2 * | 6/2014 | Frink ...................... G06F 1/187 361/679.49 |
| 2005/0024825 A1 * | 2/2005 | Smith ...................... G06F 1/181 361/679.46 |
| 2009/0251851 A1 * | 10/2009 | McGill, Sr. ............ H05K 7/186 361/623 |
| 2012/0099272 A1 * | 4/2012 | Pergolesi .............. H02M 7/003 361/688 |
| 2012/0105290 A1 * | 5/2012 | Brown ..................... H01L 23/66 343/720 |
| 2012/0120596 A1 * | 5/2012 | Bechtolsheim .... H05K 7/20572 361/679.48 |
| 2012/0243160 A1 * | 9/2012 | Nguyen .................. G06F 1/181 361/679.08 |
| 2012/0243173 A1 * | 9/2012 | Archibald ............... G06F 1/206 361/679.46 |

(Continued)

*Primary Examiner* — Anthony Haughton
*Assistant Examiner* — Razmeen Gafur
(74) *Attorney, Agent, or Firm* — Polsinelli PC (57) ABSTRACT

Systems and methods for distributing power within a rack system, including a power distribution unit ("PDU") and multiple servers, are provided. The internal power cable contains a first or a second power socket at one of its ends. The first power socket can be located on the same side as t the PDU while the second power socket can be located close to a PSU of the PSUs that are located on a different side of the PDU. The first power socket of the internal power cable can be connected to the PDU via a first short power cable. The PSU located on the different side of the PDU can be connected to the PDU via a second short power cable between the second power socket of the internal power cable and a power socket of the PSU, the internal power cable, and the first short power cable.

21 Claims, 5 Drawing Sheets

(56) References Cited

U.S. PATENT DOCUMENTS

| | | | | |
|---|---|---|---|---|
| 2012/0327602 A1* | 12/2012 | Kulkarni | ............... | H02M 7/003 361/700 |
| 2013/0003299 A1* | 1/2013 | Wissner | ................ | H02M 7/003 361/695 |
| 2013/0039001 A1* | 2/2013 | Jau | ....................... | H05K 7/1492 361/679.48 |
| 2013/0044434 A1* | 2/2013 | Sharaf | ................. | H05K 7/20927 361/702 |
| 2013/0094122 A1* | 4/2013 | Domes | ................. | H05K 7/1432 361/321.1 |
| 2013/0170141 A1* | 7/2013 | Hankamaki | ........ | H05K 7/20218 361/699 |
| 2013/0194750 A1* | 8/2013 | Dunwoody | ........ | H05K 7/20781 361/702 |
| 2013/0229768 A1* | 9/2013 | Doll | .......................... | G06F 1/20 361/679.46 |
| 2013/0235524 A1* | 9/2013 | Baba | .................... | H05K 7/1452 361/695 |
| 2013/0265724 A1* | 10/2013 | Kaneko | ................... | H01L 21/50 361/715 |
| 2013/0265725 A1* | 10/2013 | Harvilchuck | ........... | G06F 1/181 361/720 |
| 2013/0285513 A1* | 10/2013 | Tani | .................... | H02K 11/0073 310/68 D |
| 2013/0294028 A1* | 11/2013 | Lafont | ............... | H05K 7/20127 361/694 |
| 2013/0301220 A1* | 11/2013 | Hotta | .................... | H02K 11/33 361/699 |
| 2013/0322012 A1* | 12/2013 | Dunwoody | ............... | G06F 1/20 361/679.53 |
| 2013/0322016 A1* | 12/2013 | Jones | ................... | H05K 7/1432 361/689 |
| 2013/0329364 A1* | 12/2013 | Kameno | ............ | H05K 7/20563 361/697 |

* cited by examiner

SYSTEMS AND METHODS FOR DISTRIBUTING POWER IN A SERVER SYSTEM

TECHNICAL FIELD

The present technology relates generally to server systems in a telecommunications network.

BACKGROUND

Modern server farms or datacenters typically employ a large number of servers to handle processing needs for a variety of application services. Servers are typically arranged within racks or other confined spaces. To save spaces, servers inside a rack often share a power distribution unit ("PDU"). The PDU is often mounted outside the rack so that a technician can perform regular maintenance, repair, or replace components of the servers inside the rack without powering down the entire rack.

However, an external-mounted PDU creates problems in routing power cables between the PDU and power supply units (PSUs) of servers inside a rack. Thus, there is a need to provide an optimized power cable routing.

SUMMARY

Systems and methods in accordance with various embodiments of the present technology provide a solution to the above-mentioned problems by providing an internal power cable in each server of a rack system. More specifically, various embodiments of the present technology provide multiple servers inside a rack system, each of which contains an internal power cable and two or more power supply units (PSUs). An internal power cable can be arranged with a substantially optimized routing within a corresponding server (e.g., mounted on a chassis of the server to stay clear from other components of the server and/or save space inside the chassis. Each end of the internal power cable can contain a power socket that is located close to one of the two or more PSUs of the corresponding server.

In some embodiments, two or more power sockets of an internal power cable can be configured at one or more sides of a server. Each of the two or more power sockets of the internal power cable can be located close to a corresponding power socket of a PSU of the server. In some implementations, one of the two or more power sockets can be located close to at least one cooling component of the server.

In some embodiments, a server of a rack system can have two or more PSUs and an internal power cable. A first PSU of the two or more PSUs is located on a first side (e.g., a left side) of the server while a second PSU of the two or more PSUs is located on a second side (e.g., a right side) of the server. One of two ends of the internal power cable contains a first power socket or a second power socket, which is located on the first side of the server or the second side of the server, respectively.

In some implementation, a power distribution unit ("PDU") of a rack system is mounted on a left side (e.g., a first side) of the rack system. A first short power cable can be configured to connect the PDU to the first power socket of the internal power cable. The second PSU can be connected to the PDU via a second short power cable between a power socket of the second PSU and the second power socket of the internal power cable, the internal power cable, and the first short power cable. The first PSU can be connected to the PDU via a third short power cable between a power socket of the first PSU and the PDU.

In some implementation, a power distribution unit ("PDU") of a rack system is mounted on a right side (e.g., a second side) of the rack system. A first short power cable can be configured to connect the PDU to the second power socket of the internal power cable. The first PSU can be connected to the PDU via a second short power cable between a power socket of the first PSU and the first power socket of the internal power cable, the internal power cable, and the first short power cable. The second PSU can be connected to the PDU via a third short power cable between a power socket of the second PSU and the PDU.

In some embodiments, an internal power cable of a server can include an elongated thermal conductor and an electrical conductor layer surrounding at least a portion of the elongated thermal conductor. The elongated thermal conductor is capable of transferring heat generated in the electrical conductor and/or heat from one end of the internal power cable to the other end of the internal conductor cable. In some embodiments, an internal power cable of a server can be connected to at least one cooling component of the server.

In some embodiments, a portion of an internal power cable of a server can be a flexible power cable that includes an insulation and sheath layer. The flexible power cable is configured to withstand forces of repeated flexing and abrasion. The insulation and sheath layer can include a material from at least one of polyvinylchloride (PVC), fluoroethylenepropylene (PEP), or polytetrafluorethylene (TFE).

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION

Various embodiments of the present technology provide systems and methods for distributing power within a rack system. The rack system contains a power distribution unit ("PDU") and multiple servers. In some embodiments, a server of the rack system contains two or more PSUs and an internal power cable. The internal power cable contains a first power socket or a second power socket at one of its ends. The first power socket can be located on the same side as that of the PDU while the second power socket can be located close to a PSU of the two or more PSUs that is located on a different side of the PDU. The first power socket of the internal power cable can be connected to the PDU via a first short power cable. The PSU located on the different side of the PDU can be connected to the PDU via a second short power cable between the second power socket of the internal power cable and a power socket of the PSU, the internal power cable, and the first short power cable.

Figure 1A:
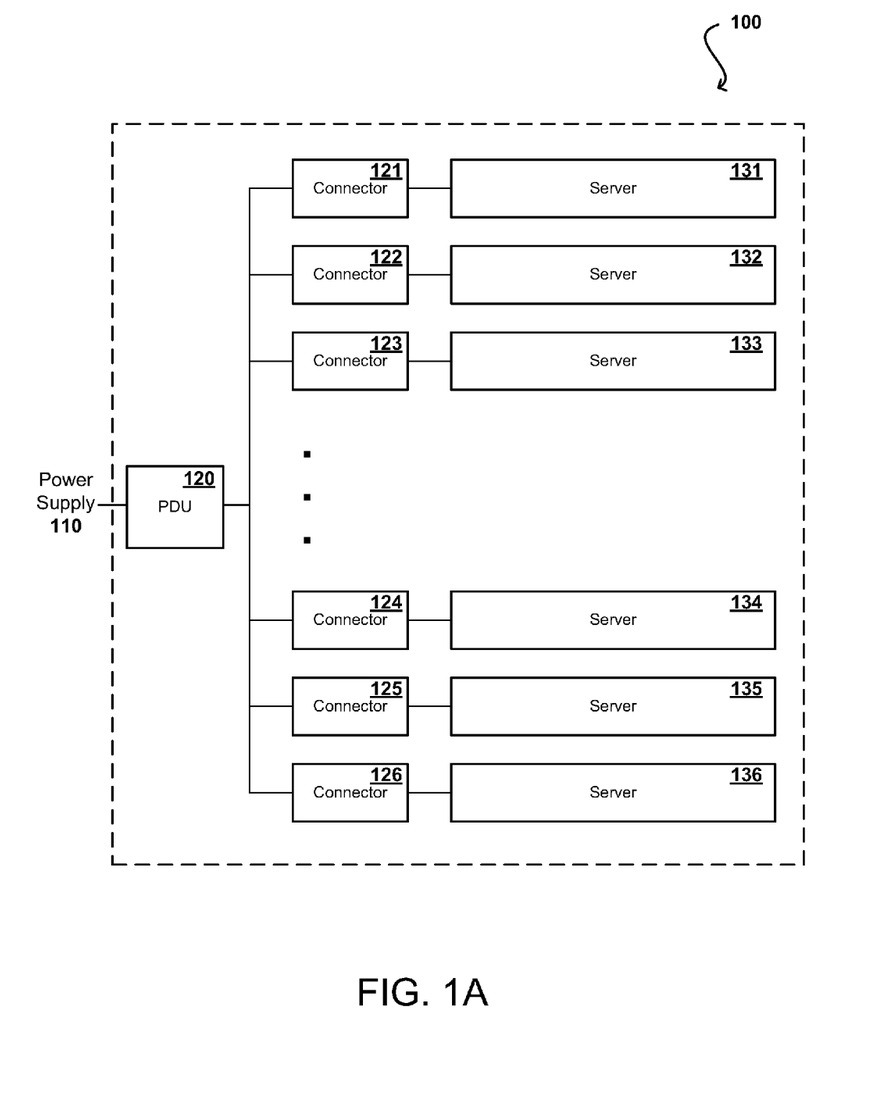
FIG. 1A illustrates a schematic block diagrams of an exemplary rack system containing a connector to each of servers of the rack system in accordance with an implementation of the present technology.

FIG. 1A illustrates a schematic block diagrams of an exemplary rack system 100 containing a connector to each of servers of the rack system 100 in accordance with an implementation of the present technology. In this example, the rack system 100 comprises a PDU 120 connected to a power supply 110, a plurality of servers (e.g., 131, 132, 133, 134, 135 and 136) and a plurality of connectors (e.g., 121, 122, 123, 124, 125 and 126) that are coupled between the PDU 120 and corresponding servers.

Figure 1B:
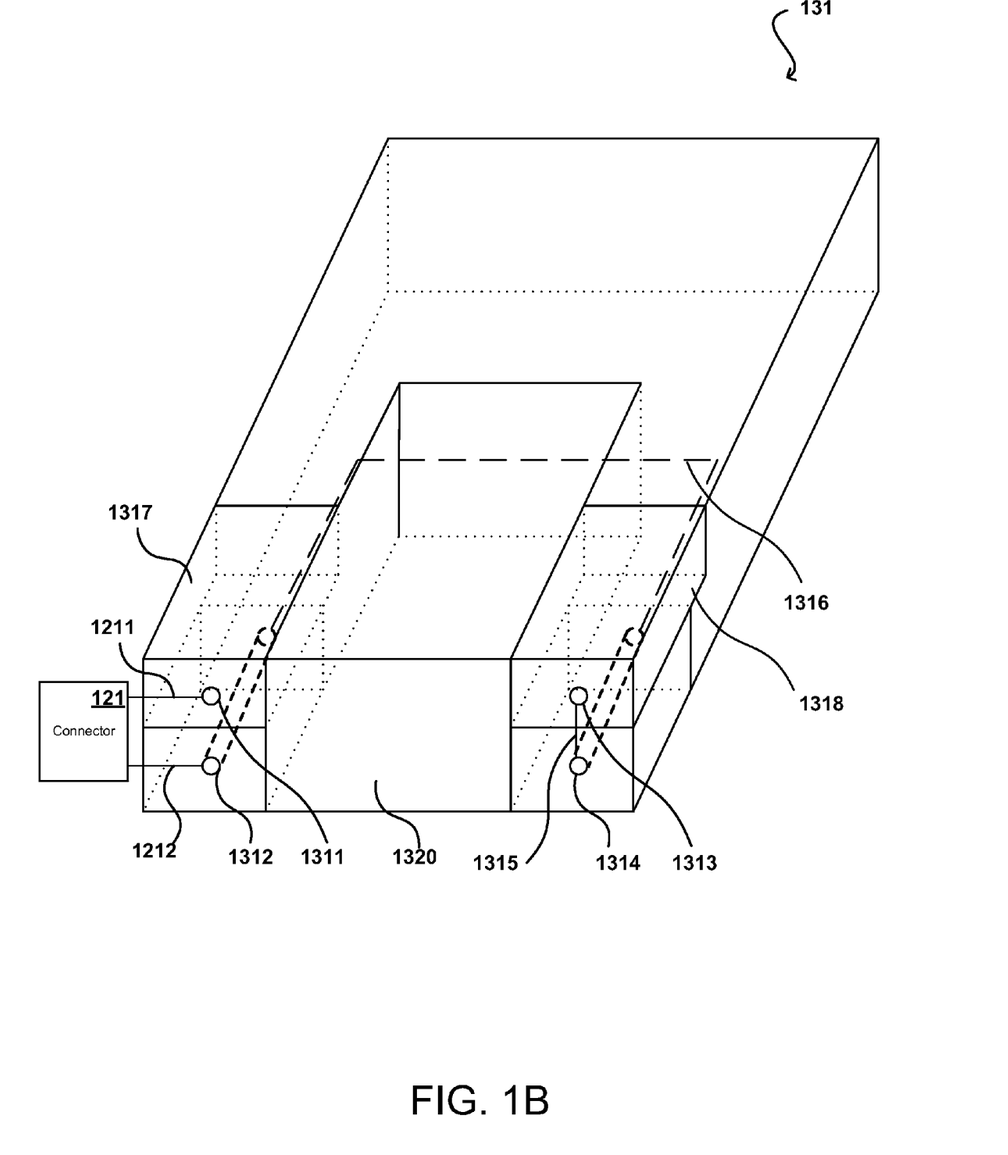
FIG. 1B demonstrates a schematic block diagrams of a server of the rack system containing an internal power cable in accordance with implementations of the present technology.

FIG. 1B demonstrates a schematic block diagrams of a server 131 of the rack system 100 containing an internal power cable 1316 in accordance with implementations of the present technology. In this example, the server 131 includes the internal power cable 1316, and two PSUs (i.e., 1317 and 1318) that converts an AC power supply from the PDU 120 via the connector 121 and provides power to the server 131. The connector 121 is located on the left side of the server 131. The connector 121 is connected to a power socket 1311 of the PSU 1317 via a short power cable 1211 and connected to a first power socket 1312 of the internal power cable 1316 via a short power cable 1212. The PSU 1318 is located on a different side of the connector 121. A power socket 1313 of the PSU 1318 is connected to a second power socket 1314 of the internal power cable 1316 via a short power cable 1315. The PSU 1318 can receive the AC power supply from the PDU 120 via the connector 121, the short power cable 1212, the internal power cable 1316, and the short power cable 1315. The PSU 1318 receives the AC power supply from the PDU 120 via the connector 121, and the short power cable 1211.

In some embodiments, the internal power cable 1316 can be mounted on a chassis of the server 131 such that the internal power cable 1316 stays clear from other components (e.g., a motherboard and cooling components 1320) of the server 131 and/or saves space inside the chassis of the server 131.

The two PSUs 1317 and 1318 are configured to supply powers to various component (not shown) of the server 131, such as at least one microprocessor or CPU, cache, NB logic, PCIe slots, Memory, SB logic, ISA slots, PCI slots, UPS and/or a controller. After being powered on, the server 131 is configured to load software application from memory, computer storage device, or an external storage device to perform various operations.

The main memory of the server 131 can be coupled to the CPU via a north bridge (NB) logic. A memory control module can be used to control operations of the memory by asserting necessary control signals during memory operations. The main memory may include, but is not limited to, dynamic random access memory (DRAM), double data rate DRAM (DDR DRAM), static RAM (SRAM), or other types of suitable memory.

In some implementations, the CPU can be multi-core processors, each of which is coupled together through a CPU bus connected to the NB logic. In some implementations, the NB logic can be integrated into the CPU. The NB logic can also be connected to a plurality of peripheral component interconnect express (PCIe) ports and a south bridge (SB) logic. The plurality of PCIe ports can be used for connections and buses such as PCI Express x1, USB 2.0, SMBus, SIM card, future extension for another PCIe lane, 1.5 V and 3.3 V power, and wires to diagnostics LEDs on the server's chassis.

In some implementations, the NB logic and the SB logic of the server 131 are connected by a peripheral component interconnect (PCI) Bus. The PCI Bus can support function on the CPU in a standardized format that is independent of any of CPU's native buses. The PCI Bus can be further connected to a plurality of PCI slots (e.g., a PCI slot). Devices connect to the PCI Bus may appear to a bus controller as being connected directly to a CPU bus, assigned addresses in the CPU's address space, and synchronized to a single bus clock. PCI cards can be used in the plurality of PCI slots include, but are not limited to, network interface cards (NICs), sound cards, modems, TV tuner cards, disk controllers, video cards, small computer system interface (SCSI) adapters, and personal computer memory card international association (PCMCIA) cards.

The SB logic can couple the PCI bus to a plurality of expansion cards or slots (e.g., an ISA slot) via an expansion bus. The expansion bus can be a bus used for communications between the SB logic and peripheral devices, and may include, but is not limited to, an industry standard architecture (ISA) bus, PC/104 bus, low pin count bus, extended ISA (EISA) bus, universal serial bus (USB), integrated drive electronics (IDE) bus, or any other suitable bus that can be used for data communications for peripheral devices.

In some implementations, the SB logic is further coupled to a controller that is connected to the at least one PSU. In some implementations, the controller can be a baseboard management controller (BMC), rack management controller (RMC), a keyboard controller, or any other suitable type of system controller. The controller is configured to control operations of the two PSUs 1317 and 1318 and/or other applicable operations. In some implementations, the controller is configured to monitor processing demands, power consumptions, and components and/or connection status of the server 131.

Although only certain components are shown within the rack system 100 in FIG. 1B and the server 131 in FIG. 1B, various types of electronic or computing components that are capable of processing or storing data, or receiving or transmitting signals can also be included in the rack system 100 and the server 131. Further, the electronic or computing components in the rack system 100 and the server 131 can be configured to execute various types of application and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for in the rack system 100 and the server 131, a variety of networking and messaging protocols can be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the rack system 100 and the server 131 illustrated in FIG. 1A and FIG. 1B are used for purposes of explanation. Therefore, a network system can be implemented with many variations, as appropriate, yet still provide a configuration of network platform in accordance with various embodiments of the present technology.

In exemplary configurations of FIG. 1A and FIG. 1B, in the rack system 100 and the server 131 can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art.

One of ordinary skilled in the art will appreciate that in the rack system 100 and the server 131 in FIGS. 1A and 1B are for illustration purpose only. The rack system 100 and the server 131 may include fewer or various other components and/or combinations are possible as well within the scope of various embodiments.

The above discussion is meant to be illustrative of the principles and various embodiments of the present technology. Numerous variations and modifications will become apparent once the above disclosure is fully appreciated.

Figure 2:
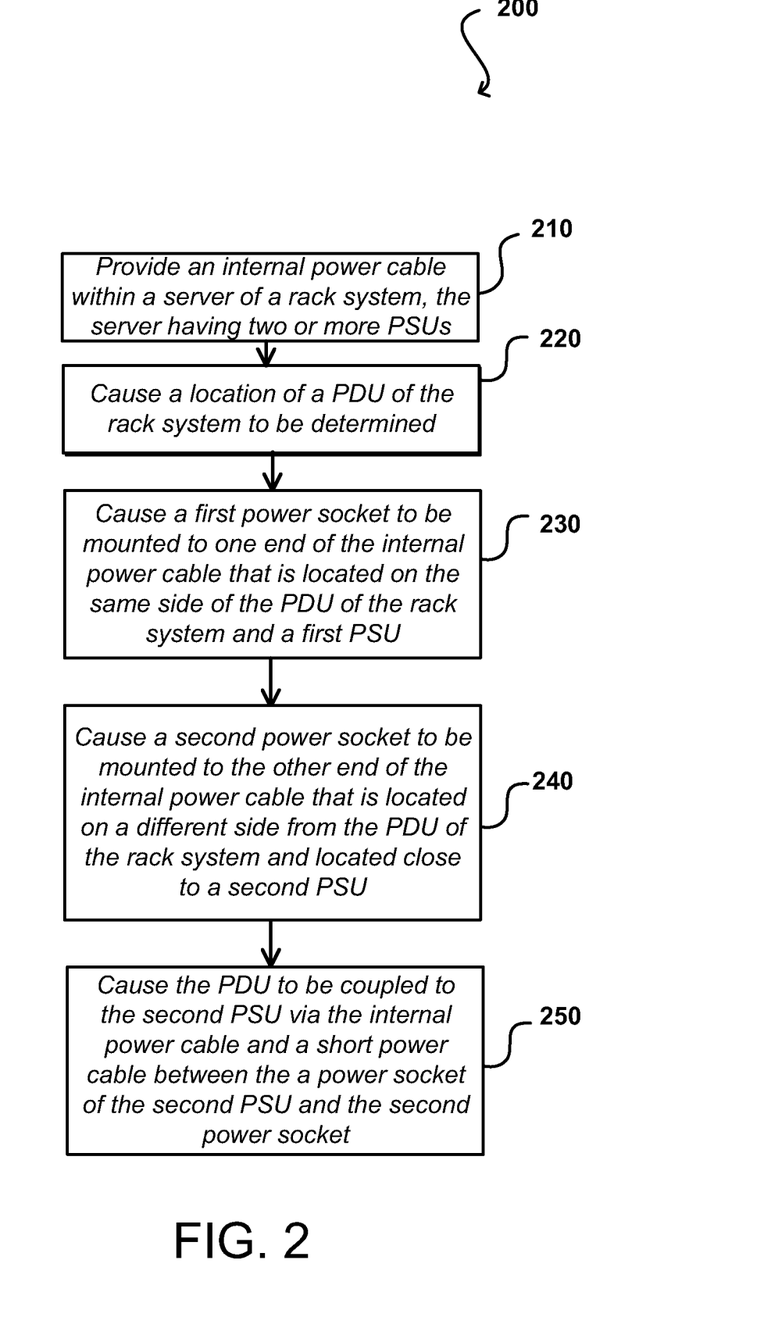
FIG. 2 illustrates an exemplary method of distributing power to a server system in accordance with implementations of the present technology.

FIG. 2 illustrates an exemplary method of distributing power to a server system in accordance with implementations of the present technology. It should be understood that the exemplary method 200 is presented solely for illustrative purposes and that in other methods in accordance with the present technology can include additional, fewer, or alternative steps performed in similar or alternative orders, or in parallel. The exemplary method 200 starts with providing an internal power cable within a server of a rack system that has two or more PSUs, at step 210. The rack system can include a plurality of servers, as illustrated in FIG. 1A.

At step 220, a location of a PDU of the rack system can be determined. The location of the PDU can be on left, right, front or back of the rack system. At step 230, a first power socket can be mounted to a first end of the internal power cable that is located on the same side of the PDU of the rack system and a first PSU of the server, as illustrated in FIG. 1B. In some implementations, the PDU can be connected to the first power socket of the internal power cable via a first short power cable and connected to a power socket of the first PSU via a second short power cable.

At step 240, a second power socket can be mounted to a second end of the internal power cable that is located on a different side from the PDU of the rack system and located close to a second PSU. The second PSU can be connected to the PDU via a third short power cable between a power socket of the second PSU and the second power socket of the internal power cable, the internal power cable, and the first short power cable, at step 250.

Terminologies

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks can be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments, networks, devices, ports, physical or logical links, and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources can include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources can be used to support virtual networks, virtual machines (VM), databases, applications (Apps), etc.

Cloud computing resources can include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

Figure 3:
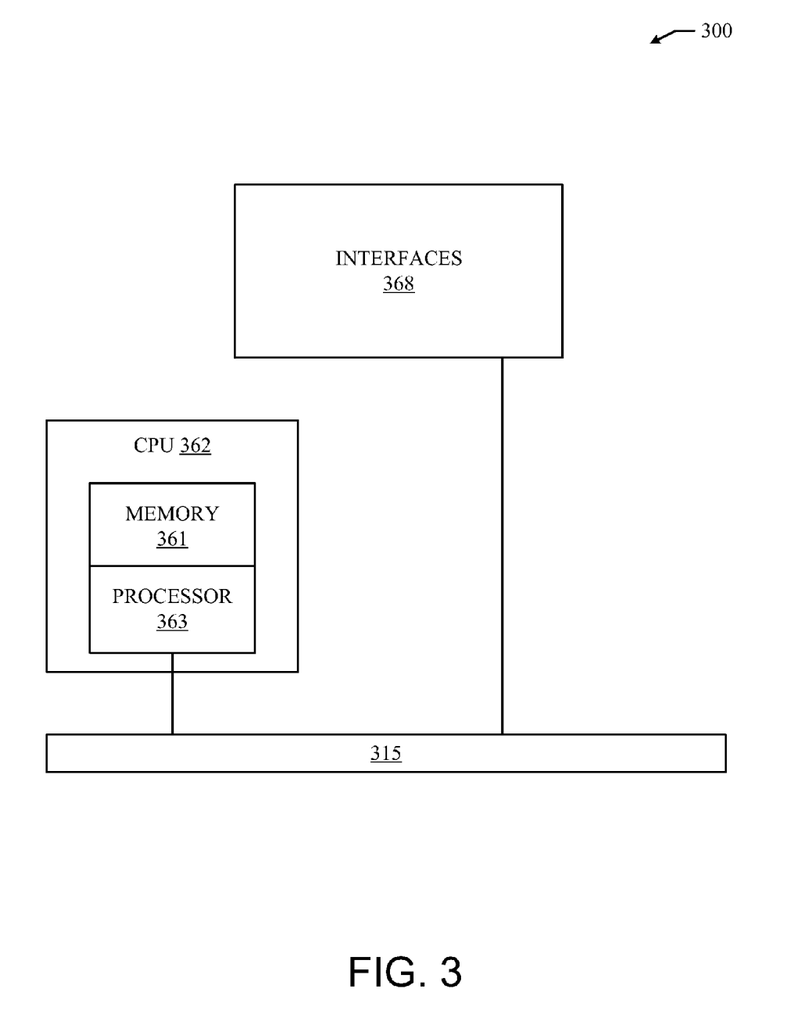
FIG. 3 illustrates an exemplary computing device in accordance with various implementations of the technology.

In a network switch system, a lookup database can be maintained to keep track of routes between a number of end points attached to the switch system. However, end points can have various configurations and are associated with numerous tenants. These end-points can have various types of identifiers, e.g., IPv4, IPv6, or Layer-2. The lookup database has to be configured in different modes to handle different types of end-point identifiers. Some capacity of the lookup database is carved out to deal with different address types of incoming packets. Further, the lookup database on the network switch system is typically limited by 1K virtual routing and forwarding (VRFs). Therefore, an improved lookup algorithm is desired to handle various types of end-point identifiers. The disclosed technology addresses the need in the art for address lookups in a telecommunications network. Disclosed are systems, methods, and computer-readable storage media for unifying various types of end-point identifiers by mapping end-point identifiers to a uniform space and allowing different forms of lookups to be uniformly handled. A brief introductory description of example systems and networks, as illustrated in FIGS. 3 and 4, is disclosed herein. These variations shall be described herein as the various examples are set forth. The technology now turns to FIG. 3.

FIG. 3 illustrates an example computing device 300 suitable for implementing the present technology. Computing device 300 includes a master central processing unit (CPU) 362, interfaces 368, and a bus 315 (e.g., a PCI bus). When acting under the control of appropriate software or firmware, the CPU 362 is responsible for executing packet management, error detection, and/or routing functions, such as miscabling detection functions, for example. The CPU 362 preferably accomplishes all these functions under the control of software including an operating system and any appropriate applications software. CPU 362 can include one or more processors 363 such as a processor from the Motorola family of microprocessors or the MIPS family of microprocessors. In an alternative embodiment, processor 363 is specially designed hardware for controlling the operations of the computing device 300. In a specific embodiment, a memory 361 (such as non-volatile RAM and/or ROM) also forms part of CPU 362. However, there are many different ways in which memory could be coupled to the system.

The interfaces 368 are typically provided as interface cards (sometimes referred to as "line cards"). Generally, they control the sending and receiving of data packets over the network and sometimes support other peripherals used with the computing device 300. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces can include ports appropriate for communication with the appropriate media. In some cases, they can also include an independent processor and, in some instances, volatile RAM. The independent processors can control such communications intensive tasks as packet switching, media control and management. By providing separate processors for the communications intensive tasks, these interfaces allow the master microprocessor 362 to efficiently perform routing computations, network diagnostics, security functions, etc.

Although the system shown in FIG. 3 is one specific computing device of the present technology, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it can employ one or more memories or memory modules (including memory 361) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc.

Figure 4A:
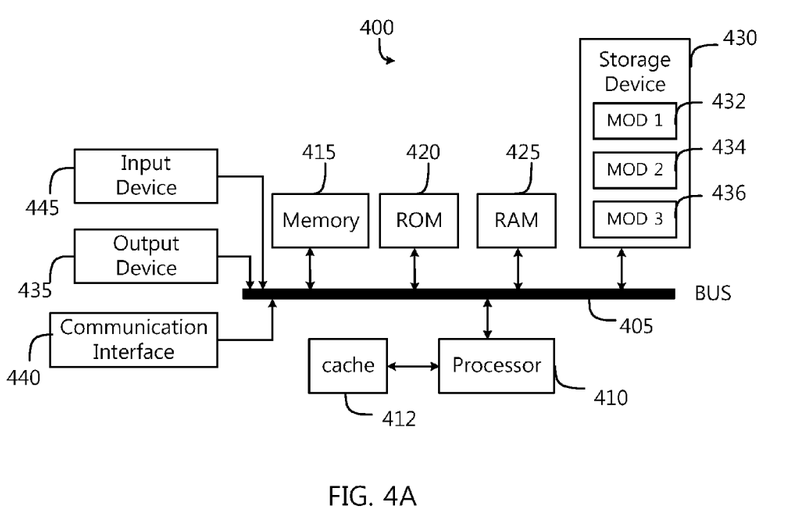
FIGS. 4A and 4B illustrate exemplary systems in accordance with various embodiments of the present technology.
Figure 4B:
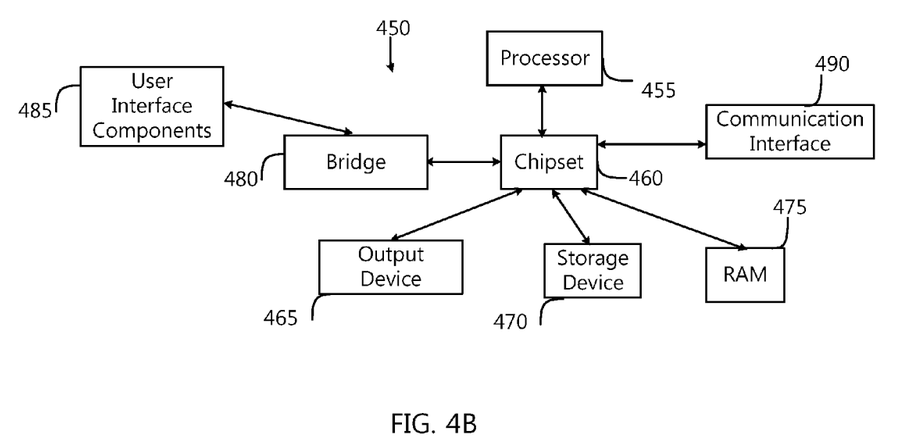

FIG. 4A, and FIG. 4B illustrate example possible systems in accordance with various aspects of the present technology. The more appropriate embodiment will be apparent to those of ordinary skill in the art when practicing the present technology. Persons of ordinary skill in the art will also readily appreciate that other system examples are possible.

FIG. 4A illustrates a conventional system bus computing system architecture 400 wherein the components of the system are in electrical communication with each other using a bus 405. Example system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 can be available for use as well. The memory 415 can include multiple different types of memory with different performance characteristics. The processor 410 can include any general purpose processor and a hardware module or software module, such as module 432, module 434, and module 436 stored in storage device 430, configured to control the processor 410 as well as a special-purpose processor where software instructions are incorporated into the actual processor design. The processor 410 can essentially be a completely self-contained computing system, containing multiple cores or processors, a bus, memory controller, cache, etc. A multi-core processor can be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here can easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, output device 435 (e.g., a display), and so forth, to carry out the function.

FIG. 4B illustrates a computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 470, which can include magnetic media, and solid state media, for example. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or RAM 475. Further, the machine can receive inputs from a user via user interface components 485 and execute appropriate functions, such as browsing functions by interpreting these inputs using processor 455.

It can be appreciated that example systems 400 and 450 can have more than one processor 410 or be part of a group or cluster of computing devices networked together to provide greater processing capability.

For clarity of explanation, in some instances the present technology can be presented as including individual functional blocks including functional blocks comprising devices, device components, steps or routines in a method embodied in software, or combinations of hardware and software.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Various aspects of the present technology provide systems and methods for distributing power in a rack system. While specific examples have been cited above showing how the optional operation can be employed in different instructions, other examples can incorporate the optional operation into different instructions. For clarity of explanation, in some instances the present technology can be presented as including individual functional blocks including functional blocks comprising devices, device components, steps or routines in a method embodied in software, or combinations of hardware and software.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent examples, or portions thereof, are implemented in hardware, the present invention can be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these technology can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In examples utilizing a Web server, the Web server can run any of a variety of server or mid-tier applications, including HTTP servers, FTP servers, CGI servers, data servers, Java servers and business application servers. The server(s) can also be capable of executing programs or scripts in response requests from user devices, such as by executing one or more Web applications that can be implemented as one or more scripts or programs written in any programming language, such as Java®, C, C# or C++ or any scripting language, such as Perl, Python or TCL, as well as combinations thereof. The server(s) can also include database servers, including without limitation those commercially available from open market.

The server farm can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system can also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate examples can have numerous variations from that described above. For example, customized hardware might also be used and/or particular elements might be implemented in hardware, software (including portable software, such as applets) or both. Further, connection to other computing devices such as network input/output devices can be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EPROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the technology and teachings provided herein, a person of ordinary skill in the art will appreciate other ways and/or methods to implement the various aspects of the present technology.

The specification and drawings are, accordingly, to be regarded in an illustrative rather than a restrictive sense. It will, however, be evident that various modifications and changes can be made thereunto without departing from the broader spirit and scope of the invention as set forth in the claims.

What is claimed is:

1. A system, comprising:
    a power distribution unit (PDU) mounted on a first side of the system;
    a plurality of servers, a server of the plurality of servers including two or more power supply units (PSUs) and an internal power cable, a first PSU of the two or more PSUs of the server located close to or at the first side of the system and a second PSU of the two or more PSUs of the server located close to or at a second side of the system; and
    a plurality of connectors, each of the plurality of connectors coupled between the PDU and one of the plurality of server;
    wherein the internal power cable has a first power socket mounted on one end and a second power socket mounted on the other end, the first power socket located at the first side of the system and the second power socket located at the second side of the system;
    wherein the second PSU is coupled to the PDU of the system via a first short power cable between a power socket of the second PSU and the second power socket, the internal power cable, and a second short power cable between the first power socket and a corresponding one of the plurality of connectors.

2. The system of claim 1, wherein the first PSU is coupled to the PDU of the system via a third short power cable between a power socket of the first PSU and the corresponding one of the plurality of connectors.

3. The system of claim 1, wherein the internal power cable is mounted on a chassis of the server.

4. The system of claim 1, wherein the first side of the system is one of front, back, left or right side of the system.

5. The system of claim 1, wherein at least one of the first power socket and the second power socket of the internal power cable is located close to one cooling component of the server.

6. The system of claim 1, wherein the internal power cable of the server includes an elongated thermal conductor and an electrical conductor layer surrounding at least a portion of the elongated thermal conductor.

7. The system of claim 6, wherein the internal power cable of the server is connected to at least one cooling component of the server.

8. The system of claim 1, wherein at least one portion of the internal power cable of the server is a flexible cable that includes an insulation and sheath layer, the flexible cable configured to withstand forces of repeated flexing and abrasion.

9. The system of claim 8, wherein the insulation and sheath layer includes one material from at least one of polyvinylchloride (PVC), fluoroethylenepropylene (PEP), or polytetrafluorethylene (TFE).

10. A computing device, comprising:
    two or more power supply units (PSUs), a first PSU of the two or more PSUs located close to or at a first side of the computing device and a second PSU of the two or more PSUs located close to or at a second side of the computing device, a power distribution unit (PDU) located at the first side of the computing device; and
    an internal power cable, the internal power cable having a first power socket mounted on one end and a second power socket mounted on the other end, the first power socket located at the first side of the computing device and the second power socket located at the second side of the computing device;
    wherein the second PSU is coupled to the PDU via a first short power cable between a power socket of the second PSU and the second power socket, and the internal power cable.

11. The computing device of claim 10, wherein the first PSU is coupled to the PDU via a third short power cable between a power socket of the first PSU and the PDU.

12. The computing device of claim 10, wherein the internal power cable is mounted on a chassis of the computing device.

13. The computing device of claim 10, wherein the first side of the computing device is one of front, back, left or right side of the computing device.

14. The computing device of claim 10, wherein at least one of the first power socket and the second power socket of the internal power cable is located close to one cooling component of the computing device.

15. The computing device of claim 10, wherein the internal power cable includes an elongated thermal conductor and an electrical conductor layer surrounding at least a portion of the elongated thermal conductor.

16. The computing device of claim 10, wherein the internal power cable is connected to at least one cooling component of the computing device.

17. The computing device of claim 10, wherein at least one portion of the internal power cable is a flexible cable that includes an insulation and sheath layer, the flexible cable configured to withstand forces of repeated flexing and abrasion.

18. The computing device of claim 17, wherein the insulation and sheath layer includes one material from at least one of polyvinylchloride (PVC), fluoroethylenepropylene (PEP), or polytetrafluorethylene (TFE).

19. A computer-implemented method for distributing power in a computing system having two or more PSUs, comprising:
    providing an internal power cable within the computing system;
    causing a location of a power distribution unit (PDU) of the computing system to be determined, the PDU located on a first side of the computing system, a first PSU of the two or more PSUs located close to or at the first side of the computing system and a second PSU of the two or more PSUs located close to or at a second side of the computing system;
    causing a first power socket to be mounted to a first end of the internal power cable, the first power socket located at the first side of the computing system;

causing a second power socket to be mounted to a second end of the internal power cable, the second power socket located at the second side of the computing system; and causing the second PSU to be coupled to the PDU via a first short power cable between a power socket of the second PSU and the second power socket, and the internal power cable.

20. The computer-implemented method of claim 19, further comprising:

causing the first PSU to be coupled to the PDU via a third short power cable between a power socket of the first PSU and the PDU.

21. The computer-implemented method of claim 19, further comprising:

causing the internal power cable to be mounted on a chassis of the computing system.

\* \* \* \* \*